United States Patent [19]

Schwab

[11] Patent Number: 5,294,425
[45] Date of Patent: Mar. 15, 1994

[54] POLYSILAZANE PRECURSORS FOR SILICON NITRIDE AND RESULTANT PRODUCTS

[75] Inventor: Stuart T. Schwab, San Antonio, Tex.

[73] Assignee: Southwest Research Institute, San Antonio, Tex.

[21] Appl. No.: 764,793

[22] Filed: Sep. 24, 1991

[51] Int. Cl.$^5$ .............................................. C01B 33/04
[52] U.S. Cl. .................................. 423/324; 423/344; 501/97
[58] Field of Search .................. 423/344, 324; 501/97, 501/92

[56] References Cited

U.S. PATENT DOCUMENTS

| | | | |
|---|---|---|---|
| 4,395,460 | 7/1983 | Gaul | 423/345 |
| 4,397,828 | 8/1983 | Seyferth et al. | 423/344 |
| 4,840,778 | 6/1989 | Arai et al. | 423/344 |
| 4,983,552 | 1/1991 | Gallo | 501/92 |
| 5,084,423 | 1/1992 | Vaahs et al. | 423/344 |

FOREIGN PATENT DOCUMENTS 61-151005  7/1986  Japan .................................. 423/344

Primary Examiner—R. Bruce Breneman

[57] ABSTRACT

A method of making a polysilazane comprising forming a reaction medium comprising at least one halomonosilane, an ammonium compound, and an organic solvent for said at least one halomonosilane, carrying out the reaction between said at least one halomonosilane and said ammonium compound in the absence of any catalyst, oxygen, and moisture at atmospheric pressure and at a temperature of about $-80°$ C. to $50°$ C. for a time sufficient to form said polysilazane, and separating said polysilazane from said reaction medium.

6 Claims, 1 Drawing Sheet

POLYSILAZANE PRECURSORS FOR SILICON NITRIDE AND RESULTANT PRODUCTS

BACKGROUND OF THE INVENTION

The instant invention relates to the method of making polysilazanes which can be thermally transformed into silicon nitride of exceptional purity in exceptionally high ceramic yield.

Difficulties inherent in traditional, powder-based techniques have fostered the investigation of chemical approaches to ceramic processing. These investigations led to the development of the "sol-gel" technique of ceramic fabrication, and the development of inorganic polymers which decompose into ceramics when heated, ("preceramic polymers"). While the sol-gel approach is most readily applied to the fabrication of oxide glasses and ceramics (e.g., silica, titania, cordierite, etc.), preceramic polymers are generally applied to the fabrication of non-oxide ceramics (e.g., silicon carbide, silicon nitride, boron nitride, etc.).

Advanced ceramics offer unique combinations of mechanical and electro-optical properties and are finding increased use in high technology applications. Current techniques of advanced ceramic component fabrication are based on pressureless green body consolidation in which voids often remain in the final microstructure. These voids have deleterious effects on the structural properties of the ceramic. Much of this residual porosity is generated when the organic binder used to consolidate the ceramic powder is burned off. One approach to minimizing void formations is through the substitution of the traditional fugitive binder with an organometallic polymer ("preceramic polymer") which will decompose into a predetermined ceramic when heated. The void space normally induced during organic binder burn-out would be replaced by the ceramic produced through the pyrolysis of the preceramic polymer.

Silicon nitride ($Si_3N_4$) is a ceramic material in great demand for its superior high-temperature properties and excellent strength to weight ratio. Unfortunately, like other covalent materials, silicon nitride is difficult to sinter because of its low self-diffusivity. Densification can be achieved without applied pressure if sintering acids are used; however, the presence of these glassy materials in the ceramic seriously detracts from the material's high-temperature strength.

Although the utility of organometallics in the chemical vapor deposition (CVD) of ceramics was demonstrated over twenty-five years ago, many difficulties were encountered, and these efforts were abandoned. While efforts to develop useful preceramic polymers continued through the 1970's, it was not until the successful development of polymeric precursors to silicon carbide, and the commercial success of the Nicalon fibers made from them, that the investigation of polymeric precursors to silicon nitride and other advanced ceramics became widespread. Reviews of preceramic polymers in general and of polymeric precursors to silicon nitride (polysilazanes) have recently been published.

Synthesis of such polysilazanes has been accomplished by use of a two-stage dehydrocyclodimerization process as well as by the use of transition metal catalyzed reactions which require the use of high pressures and temperatures.

U.S. Pat. No. 4,460,638 also sets forth procedures for preparing silizane polymers which require either that a disilizane be used as one of the reactants or that the silane used must contain a vinyl group, a $C_1$ to $C_3$ alkyl radical, or a phenyl group. Also, the reaction temperature in the latter reaction must be at least 25° C., with much higher temperatures being utilized.

The forgoing procedures for making the polysilazane are not entirely satisfactory in that they require complex reactants, high temperature and/or pressure reaction conditions, and/or result in polymeric precursors that do not produce silicon nitride of satisfactory yield or purity.

SUMMARY OF THE INVENTION

The present invention overcomes the problems of the prior art discussed above and provides a simple method for making unique polysilazane polymeric precursors which can be transformed to high purity silicon nitride in high ceramic yield. In addition, this method produces low viscosity thermosetting precursors, which are desirable for many applications.

Briefly, the present invention comprises a method of making a polysilazane comprising forming a reaction medium comprising at least one halomonosilane, ammonia, and an organic solvent for said at least one halomonosilane, carrying out the reaction between said at least one halomonosilane and said ammonia in the absence of any catalyst, oxygen, and moisture at atmospheric pressure and at a temperature of about −80° C. to 20° C. for a time sufficient to form said polysilizane, and separating said polysilazane from said reaction medium.

The invention also comprises the resultant polysilazanes and their method of transformation to silicon nitride, use as binders for ceramic processing (including injection molding), use as ceramic coating precursors, and as matrix precursors for silicon nitride composites, all as hereinafter described.

DETAILED DESCRIPTION

Figure 1:
FIG. 1 is a photomicrograph (5,000×) of whisker development when utilizing a preceramic polymer of the present invention as a binder.

Stated in its simplest form the instant method utilizes a single reaction which is carried out at ambient pressure, low temperature, and does not require a catalyst.

The method utilizes a halomonosilane and ammonia as reactants and, optionally a primary amine.

Schematically, the single reaction step can be depicted as follows:

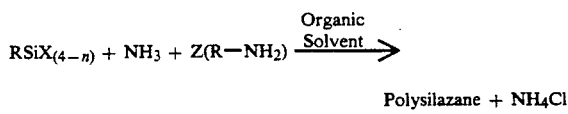

Polysilazane + $NH_4Cl$ in which
R is H, or a $C_1$ to $C_4$ alkyl group;
X is a halogen (Cl, Br, Fl, or I);
n is 0 to 3;
z is 0 or a number greater than 0

It will be evident from the foregoing that the primary amine is optional.

As to the halomonosilanes used, it is preferred to use the chlorosilanes such as dichlorosilane ($H_2SiCl_2$) or trichlorosilane ($HSiCl_3$) and, most preferably, mixtures thereof. Other silanes that can be used are $(CH_3)HSiCl_2$, $(CH_3CH_2)HSiCl_2$, $((CH_3)CH)HSiCl_2$, $(CH_3)_2$, $(CH_3CH_2)_2SiCl_2$, $(CH_3)SiCl_3$, $CH_3CH_2SiCl_3$, $((CH_3)_2CH)_2SiCl_2$, $(CH_3)_2CHCiCl_3$, mixtures thereof, and the like.

The organic solvent required is one which is a solvent for the silanes and amines used in the reaction. While any conventional organic solvent having the stated solvating properties can be used, it is preferred to use ether, such as diethylether or tetrahydrofuran (THF).

If a primary amine is used, it is preferred to use a n- or t-butyl amine. Other suitable amines are $C_1$ to $C_4$ alkyl amines such as methyl-, ethyl-, isopropyl- and n-propyl amine. It is also possible to use aryl amines such as phenyl and benzyl amines.

As to proportions of the reactants, stoichiometric proportions can be used, although it is preferred to use an excess of ammonia.

In addition to the criticality of the reactants, the reaction conditions are also important.

The reaction is a single step reaction carried out in the absence of oxygen (air) and moisture. For this purpose the reaction can be carried out in any conventional inert atmosphere that is anhydrous, such as nitrogen or argon. Conventional inert atmosphere/vacuum manifold systems or dryboxes can be used for this purpose. In addition, the reactants used should be anhydrous.

It is important to note that no catalyst is required and that the reaction is carried out at ambient pressure. As to the temperature of the reaction, the reaction can take place between $-80°$ to $50°$ C., but is preferably carried out at $0°$ C. to $50°$ C.

There is no criticality as to the order of addition of reactants to the reactor. However, it is preferred to first add the silane(s) and solvent to the reactor at the chosen reaction temperature and then to add the ammonia. If a primary amine is utilized, it should be added concomitantly (simultaneously) with the ammonia.

The reaction is carried out until the reaction is complete, the time varying dependent upon the reactants and temperature used, but which can be easily determined for any given reaction system by routine experimentation.

The resultant polysilazane is separated from the reaction medium by heating the reaction medium to reflux, then cooling to room temperature, and separating the polysilazane from any unreacted materials, ammonium chloride, and the solvent.

Dependent primarily upon the nature of the reactants used, their stoichiometry, and the exact reaction conditions, the resultant polysilazanes are obtained as waxes, solids, or thermosetting oils. Thus, depending upon the use to be made of the polysilazane any one of the forms thereof can be obtained which is most suitable for such use.

The resultant polysilazanes can be thermally transformed into silicon nitride of high purity, $\geq 90\%$ ($Si_3N_4$), in high ceramic yield, at least about 75% by weight.

The polysilazanes can be used to form silicon nitride fibers, as binders in making ceramics by cold pressing/pressureless sintering operations or injection molding, as ceramic coating precursors, and as matrix precursors for silicon nitride composites. In all of these uses, they can be utilized in the same manner as existing polysilazanes, but with the advantages of being able to be transformed into higher purity silicon nitride and being able to be processed as a low viscosity, solvent-free liquid. The absence of solvent simplifies coating and composite fabrication, and minimizes the volume of volatiles off-gassed during processing.

Although the factors responsible for the effect are unclear, the use of some of these preceramic polymers as binders in ceramic powder processing has a dramatic impact on the microstructure observed in the fired material. For example, the use of N-n-butyl hydridopolysilazane as a binder has been found to induce in-situ whisker development during processing of $Si_3N_4$ powder compacts as shown in FIG. 1. Compacts containing the polysilazanes described above all showed enhanced densification compared to compacts without additives when sintered under pressureless conditions. In addition, these polymers have also proven useful in the infiltration processing of continuous fiber-reinforced ceramic-matrix composites, and in the deposition of ceramic coatings on high-temperature substrates. In both cases, the polymers may be used either with or without solvent, and are amenable to a wide variety of processing regimes. The utility of these polysilazanes in these areas will be decribed more fully elsewhere.

The invention will be further described in connection with the following examples which are set forth for purposes of illustration only.

In these examples, unless otherwise noted, all manipulations were carried out in the absence of air and moisture in an inert atmosphere/vacuum manifold system or in a drybox (Vacuum Atmospheres HE-43-2 with HE-493 Dri-train) using conventional synthetic inorganic techniques. All solvents were freshly distilled from the appropriate drying agents and were thoroughly degassed before use. Anhydrous ammonia (99.99%) was purchased from Liquid Carbonic (San Antonio, Tex.) and used as received. Butyl amines were purchased from Aldrich (Milwaukee, Wis.) and were distilled from potassium prior to use. Dichloro and trichlorosilane were purchased from Hüls-Petrarch, and were purified by trap-to-trap distillation prior to use.

EXAMPLE 1

N-tert-butyl hydridopolysilazane: Dichlorosilane ($H_2SiCl_2$, 49 mL, 0.6 mol) and trichlorosilane ($HSiCl_3$, 20 mL, 0.2 mol) were added to tetrahydrofuran (THF, 1.6 L) at $0°$ C. Ammonia ($NH_3$, excess) and t-butyl amine ($Bu^tNH_2$, 20 mL, 0.2 mol) were added simultaneously over a period of 1 hour, with an ammonia addition continuing for an additional hour. After warming to room temperature, the solution was stirred (4 hr), and then heated to reflux under a water-cooled condensor (1.5 hr). After cooling to room temperature and settling, the solution was filtered. The majority of solvent was removed by distillation at ambient pressure under nitrogen. The majority of solvent was removed by distillation at ambient pressure under nitrogen. Remaining volatiles were removed in vacuo at room temperature to yield a stiff, waxy solid.

EXAMPLE 2

N-n-butyl hydridopolysilazane: Dichlorosilane ($H_2SiCl_2$, 79 mL, 0.6 mol) and trichlorosilane ($HSiCl_3$, 30 mL, 0.3 mol) were added to THF (1.6 L) at $0°$ C. Ammonia ($NH_3$, excess) and n-butyl amine ($Bu^nNH_3$, 30 mL, 0.3 mol) were added simultaneously over a period of 30 minutes with the ammonia addition continuing for an additional hour. After warming to room temperature, the solution was stirred (12 hr) and then heated to reflux under a water cooled condenser (2 hr). After cooling to room temperature and settling, the solution was filtered. The precipitate was washed (0.25 L THF) and the washings combined with the filtrate. The majority of solvent was removed by distillation at ambient pressure under nitrogen. Remaining volatiles were removed in vacuo at room temperature to yield a viscous oil.

EXAMPLE 3

Perhydridopolysilazane: Dichlorosilane ($H_2SiCl_2$, 105 mL, 1.21 mol) and trichlorosilane ($HSiCl_3$, 60 mL, 0.69 mol) were added to THF (3 L) at 0° C. Ammonia ($NH_3$, excess) was added to the reaction mixture by first saturating the solution and then continuing slow addition overnight. The solution was heated to reflux under a dry ice (−78° C.) cooled condensor (3 hr) and then heated to reflux under a water-cooled condensor. After cooling to room temperature and settling, the solution was filtered. The precipitate was washed (0.5 L THF) and the washings combined with the filtrate. The majority of solvent was removed by distillation at ambient pressure under nitrogen. Remaining volatiles were removed in vacuo at room temperature to yield a clear oil. After standing at ambient temperature for ca. 12 hr, the liquid was observed to have transformed into a clear solid. Addition of THF was accompanied by a loud popping sound, but no gas evolution was formed. Removal of the THF in vacuo yielded the polymer as a white free flowing powder.

EXAMPLE 4

Each of the three ceramic polymers of Examples 1, 2, and 3 are separately added to a suspension of $Si_3N_4$ powder in THF to form a 25% by weight polymer/-powder molding mixture. In the discussion and Tables that follow they are referred to, respectively, as polymers 1, 2, and 3. This slurry was sonicated (ca. 10 min.) to facilitate mixing and then heated to reflux overnight. Sonication (ca. 10 min.) was repeated after the slurry had cooled to room temperature, and the solvent removed in vacuo to yield the molding mixture as a grey-white free flowing powder. Grinding of the mixture with mortar and pestle was not required. Billets were obtained by unixially pressuring the mixture at 30,000 psi, while bars were pressed at 10,000 psi. Powders were processed and pressed in the same manner in the absence of binder to provide a control. Selected samples remained in the green state for baseline comparison purposes, while the remaining samples were either pyrolyzed in a tube furnace in flowing nitrogen at 800° C. or pyrolyzed and pressureless sintered at 1820° C. in the hot press. Pressureless sintering operations were carried out under a nitrogen atmosphere with the samples packed in a powder bed buffer system (50 wt % BN in $Si_3N_4$) enclosed in a graphic crucible to prevent degradation of the $Si_3N_4$.

In general, chemical characterization of the polymers consisted of infrared (FTIR), nuclear magnetic resonance (NMR), and thermogravimetric (TGA) analysis. In some cases, the polymers were not sufficiently soluble in the available deuterated solvents to allow for NMR analysis. Densities of the polymers were determined by pycnometry. The ceramic composition of the pyrolyzed polymers was generated from the elemental analysis of their respective chars. Briefly, the weight percentages of the elements were converted into mole percents, and each element was consumed in proportions to the stoichiometry of the likely ceramic constitutents (e.g., $3Si+4N=Si_3N_4$; $1Si+1C=SiC$, etc.). Elements present in excess of the ceramic stoichiometries were considered unbound, or "free".

Bulk densities of the green compacts and pyrolyzed compacts were determined by measuring and weighing the samples. Attempts were made to determine the densities of the sintered samples using Archimedean immersion; unfortunately, this technique did not yield rational results. Microstructural evaluation was recorded by SEM analysis of the fracture surfaces of each compact at the green, pyrolyzed, and sintered stage. The crystalline phases present were determined from the X-ray powder diffraction patterns ground samples taken from each stage of processing.

Table I below shows that green compacts made with polymers 1 and 2 exhibited good mechanical integrity, in that they did not crumble when handled, and were difficult to break by hand. Green compacts made with polymer 3 tended to crumble, but were superior to the control compacts, nonetheless. With all three binders the apparent strength of the green compacts appeared to increase when stored under inert atomosphere at room temperature. This apparent strength increase was probably the result of thermally induced crosslinking, which would have converted part of the two-dimensional polymer matrix into a stiff three-dimensional network.

To evaluate their performance during sintering, both the binders and compacts made with them were subjected to heat treatments. Previous efforts had shown that the effluent gasses generated during pyrolysis of the preceramic polymers are very reactive. The compacts were first pyrolyzed at 800° C. under flowing nitrogen in a tube furnace. TGA analysis of the binders indicated that conversion to ceramic was essentially complete at this temperature. Following pyrolysis, the compacts were heated to about 1800° C. under nitrogen in a graphite retort packed with a 50 wt % mixture of boron nitride and silicon nitride powder. This buffer mixture was used to prevent decomposition of the silicon nitride powders above 1500° C.

Table II presents the densities of the compacts made with the preceramic polymers (1, 2, and 3; 25% by weight) and the binder-free control at the various stages of processing. The green body densities are reported relative to both the theoretical density of pure $Si_3N_4$ (3.2 $gcm^{-3}$) and the theoretical density of a void free 25% by weight mixture of $Si_3N_4$ and polymer. As it was assumed that heating to 800° C. was sufficient to essentially complete the conversion of polymer to ceramic, the densities of the pyrolyzed bodies are reported relative to pure $Si_3N_4$ only. As noted in the characterization section above, experimental difficulties prevented accurate determination of the densities of the sintered samples.

One may infer from the green body densities that polymer 2 appears to have had a beneficial effect on molding mixture compaction, while polymer 3 had a somewhat deleterious effect and polymer 1 had essentially no effect. The polymers' influence on green body density appears to be a function of their viscosity. Polymer 2, isolated as a thick oil, is the least viscous of these three binders, and its presence may have added some lubricity to the molding mixture. This lubricity would have allowed the $Si_3N_4$ particles to slide past each other more easily and pack more efficiently. Polymer 3, isolated as a powder, is the most viscous of the three. Individual granules of polymer 3 were somewhat sticky or tacky, and its presence in the mixture could well have inhibited particle packing. Polymer 1, isolated as a wax, is of intermediate viscosity. While polymer 1 is somewhat sticky, it flows under applied pressure. These two viscoelastic properties appear to have cancelled each other out during compression molding to yield a compact with essentially the same density as obtained with the powder alone.

To determine what crystallographic phase changes had taken place during pyrolsis and sintering, samples from each processing step were examined by powder X-ray diffraction, the results of which are presented in Table III. In accordance with the product literature, the starting powder was composed of $\alpha$-$Si_3N_4$. While pyrolysis did not induce any phase transformation in the control, sintering induced the appearance of $\beta$-$Si_3N_4$ as a minor constituent. The compacts made with the preceramic binders also exhibited only $\alpha$-$Si_3N_4$ in green and pyrolyzed state; however, upon sintering, the result is reversed, with $\beta$-$Si_3N_4$ appearing as the major and $\alpha$-$Si_3N_4$ as the minor constituent.

The $\alpha$- to $\beta$-$Si_3N_4$ phase transformation is not fully understood, but is believed to be promoted by the presence of a liquid phase. As reflected in Table I, pyrolysis of the preceramic binders produces silica ($SiO_2$ mp ca. 1600°–1725° C.), free silicon (Si, mp 1410° C.), free carbon, and silicon carbide in addition to silicon nitride. Because it did not diffract X-rays and was assumed to be amorphous, the char composition was derived from elemental analysis. As there is no way to verify that the listed elements are indeed bound in the indicated materials, silicon, which has been shown to promote the $\alpha$- to $\beta$-$Si_3N_4$ phase transformat present in greater amounts than implied in Table I. If a liquid phase formed from the silica and/or silicon produced during pyrolysis, it could have allowed for a significant amount of phase transformation to occur, and thus account for the greater percentage of $\beta$-$Si_3N_4$ observed in the samples containing the polymer additives.

TABLE I

| Polymer | Form | Ceramic Yield (1000° C.)* | Char Composition** | Green Compact Quality |
|---|---|---|---|---|
| 1 | wax | 89 | 92.7 $Si_3N_4$ | excellent |
|   |     |    | 1.4 SiC |   |
|   |     |    | 3.1 $SiO_2$ |   |
|   |     |    | 2.8 Free Si |   |
| 2 | viscous oil | 79 | 90.2 $Si_3N_4$ | excellent |
|   |     |    | 9.6 SiC |   |
|   |     |    | 0.2 Free Carbon |   |
| 3 | powder | 92 | 93.6 $Si_3N_4$ | fair |
|   |     |    | 0.5 SiC | (somewhat crumbly) |
|   |     |    | 2.7 $SiCO_2$ |   |

TABLE I-continued

| Polymer | Form | Ceramic Yield (1000° C.)* | Char Composition** | Green Compact Quality |
|---|---|---|---|---|
|   |   |   | 3.2 Free Si |   |

*By Thermogravimetric Analysis (TGA).
**Values expressed in percent by weight, determined from elemental analysis.

TABLE II

|   | Green Body* | Green Body† | Pryolyzed Body |
|---|---|---|---|
| Control | 62.2 | — | 61.9 |
| 1 | 61.8 | 72.3 | 69.3 |
| 2 | 70.0 | 81.7 | 72.8 |
| 3 | 50.6 | 59.1 | 52.2 |

*Based on theoretical density of silicon nitride (3.2 g cm$^{-3}$).
†Based on theoretical density of a weighted average of silicon nitride and polymer.

TABLE III

|   | Green Body | Pryolyzed Body | $\beta$ Sintered Body |
|---|---|---|---|
| Control |   |   |   |
| major constituent | $\alpha$-$Si_3N_4$ | $\alpha$-$Si_3N_4$ | $\alpha$-$Si_3N_4$ |
| minor constituent | — | — | $\beta$-$Si_3N_4$ |
| Polymer 1 |   |   |   |
| major constituent | $\alpha$-$Si_3N_4$ | $\alpha$-$Si_3N_4$ | $\beta$-$Si_3N_4$ |
| minor constituent | — | — | $\alpha$-$Si_3N_4$ |
| Polymer 2 |   |   |   |
| major constituent | $\alpha$-$Si_3N_4$ | $\alpha$-$Si_3N_4$ | $\alpha$-$Si_3N_4$ |
| minor constituent | — | — | $\alpha$-$Si_3N_4$ |
| Polymer 3 |   |   |   |
| major constituent | $\alpha$-$Si_3N_4$ | $\alpha$-$Si_3N_4$ | $\beta$-$Si_3N_4$ |
| minor constituent | — | — | $\alpha$-$Si_3N_4$ |

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

I claim:

1. A method of making a perhydropolysilazane in a single reaction comprising forming a reaction medium comprising a mixture of at least one, dichlorosilane and at least one trichlorosilane, an ammonium compound, and an organic solvent for said mixture of silanes, carrying out the reaction between said mixture of silanes and said ammonium compound in the absence of any catalyst, oxygen, and moisture at atmospheric pressure and at a temperature of about −80° C. to 20° C. for a time sufficient to form said perhydrosilazane, and separating said perhydrosilazane from said reaction medium.

2. The method of claim 1 wherein a primary amine is included in the reaction medium.

3. The method of claim 2 wherein said primary amine is a $C_1$ to $C_4$ primary amine.

4. The method of claim 3 wherein said ammonium compound is ammonia, and said primary amine is a butyl amine.

5. As a product, a perhydrosilazane made by the method of any one of claims 1 to 4.

6. A method of making silicon nitride comprising heating the perhydrosilazane product of any one of claims 1 to 4 at a temperature and for time sufficient to decompose said perhydrosilazane to silicon nitride.

* * * * *